United States Patent
Wu et al.

(10) Patent No.: US 8,324,294 B2
(45) Date of Patent: *Dec. 4, 2012

(54) SOLVENT-BASED INKS COMPRISING SILVER NANOPARTICLES

(75) Inventors: Yiliang Wu, Oakville (CA); Jenny Eliyahu, Maple (CA); Ping Liu, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/042,149

(22) Filed: Mar. 7, 2011

(65) Prior Publication Data

US 2012/0232206 A1   Sep. 13, 2012

(51) Int. Cl.
| | |
|---|---|
| A61K 9/16 | (2006.01) |
| B60C 1/00 | (2006.01) |
| C04B 24/26 | (2006.01) |
| C07C 409/22 | (2006.01) |
| C08F 238/00 | (2006.01) |
| C08F 297/02 | (2006.01) |
| C08G 69/44 | (2006.01) |
| C08J 3/00 | (2006.01) |
| C08K 3/08 | (2006.01) |
| C08K 5/01 | (2006.01) |
| C08L 25/00 | (2006.01) |
| C08L 31/00 | (2006.01) |
| C08L 33/00 | (2006.01) |
| C08L 33/06 | (2006.01) |
| C08L 23/26 | (2006.01) |
| C08L 53/00 | (2006.01) |
| C08L 77/00 | (2006.01) |
| C09B 67/00 | (2006.01) |
| C09D 5/00 | (2006.01) |
| C09D 5/02 | (2006.01) |
| C09D 11/00 | (2006.01) |
| H01B 3/44 | (2006.01) |

(52) U.S. Cl. .............. 523/160; 106/31.13; 106/31.25; 106/31.6; 106/31.89; 106/31.9; 106/31.92; 523/161; 524/439; 524/474; 524/476; 524/481; 524/483; 524/543; 524/556; 524/560; 524/563; 524/570; 524/577; 524/581; 524/602

(58) Field of Classification Search ............... 523/160, 523/161; 524/439, 474, 476, 481, 483, 543, 524/556, 560, 563, 570, 577, 581, 602; 106/31.13, 106/31.25, 31.6, 31.89, 31.9, 31.92
See application file for complete search history.

(56) References Cited

U.S. PATENT DOCUMENTS

| | | |
|---|---|---|
| 7,270,694 B2 | 9/2007 | Li et al. |
| 7,494,608 B2 | 2/2009 | Li et al. |
| 8,158,032 B2 * | 4/2012 | Liu et al. .............. 252/514 |
| 2007/0099357 A1 | 5/2007 | Li et al. |
| 2009/0148600 A1 | 6/2009 | Li et al. |
| 2009/0181183 A1 | 7/2009 | Li et al. |

* cited by examiner

*Primary Examiner* — Patrick Niland
(74) *Attorney, Agent, or Firm* — Pillsbury Winthrop Shaw Pittman LLP

(57) ABSTRACT

High performing nanoparticle compositions suitable for printing, such as by inkjet printing, are provided herein. In particular, there is provided a conductive ink formulation comprising silver nanoparticles which has optimal performance, such as, reduced coffee ring effect, improved adhesion to substrates, and extended printhead de-cap time or latency time. The ink formulation comprises two or more solvents and a resin.

16 Claims, 2 Drawing Sheets

SOLVENT-BASED INKS COMPRISING SILVER NANOPARTICLES

BACKGROUND

Disclosed herein, in various embodiments, are stable, high performing nanoparticle compositions suitable for printing, such as by inkjet printing. In particular, there is provided a conductive ink formulation comprising silver nanoparticles which has optimal performance, such as, reduced coffee ring effect, improved adhesion to substrates, and extended drying time in the print head.

The benefits of silver nanoparticle technology for printed electronics application have been recently discovered. For example, ink formulations comprising silver nanoparticles have demonstrated very good printed results. However, due to batch to batch variation of the silver nanoparticle powders, especially those prepared at large scale, irreproducibility of printed performance still continues to be a problem. The major variation is the silver content. In particular, for some batches having silver nanoparticles at 90 wt % silver content (which is the weight of silver over the total weight of silver and organic stabilizers), many black dots (aggregates of silver nanoparticles) appear in the printed lines. As such, there is a need to further develop a robust ink formulation that can be able to maintain batch to batch variation of silver nanoparticle powders.

Furthermore, current metal nanoparticle compositions when deposited on a substrate often result in conductive metal ink lines that are too wide, exhibit a low conductivity, and have a "coffee ring effect." Coffee ring effect is referred to herein as when the particles in a given droplet end up along the circumference of the circle having a very thin center where the droplet was deposited on the substrate (i.e. a non-uniform deposition). In a cross-section of the droplet, a bimodal line profile (two peaks) in a surface profile measurement is observed. The deposition of a conductive metal line that exhibits a coffee ring effect and/or that are otherwise too wide may limit the inks use in certain applications. Thus, there is a further need to develop an ink formulation to reduce the coffee ring effect.

Finally, there is also a need for generally continuing improvement of previous ink formulations to provide better performance, including but not limited to, improved adhesion to substrates and/or extended drying time in printheads.

SUMMARY

According to embodiments illustrated herein, there is provided novel conductive ink formulations comprising silver nanoparticles and two or more solvents.

In particular, the present embodiments provide an ink composition comprising: metal nanoparticles comprising silver; an optional resin; and two or more ink vehicles, wherein at least one of the ink vehicles is an aliphatic hydrocarbon having a vapor pressure of less than 4 mm Hg at 25° C.

In further embodiments, there is provided an ink composition comprising: silver nanoparticles, and two or more ink vehicles selected from the group consisting of aliphatic hydrocarbon comprising at least one cyclohexane ring, cyclic terpene including monocyclic monoterpeene and bicyclic monoterpene, cyclic terpinene, terpineol, methy nanphthalene, and mixtures thereof, wherein the ink has a drying time in printer heads of from about 5 hours to about 1 week.

In further embodiments, there is provided an ink composition comprising: silver nanoparticles, and ink vehicles comprising decahydronaphthalene and bicyclohexane, wherein the ink composition has a drying time in printer heads of from about 5 hours to about 1 week.

In yet other embodiments, there is provided a conductive ink comprising: silver nanoparticles; an optional resin; and two or more ink vehicles, wherein the silver nanoparticles are dispersed in the ink vehicles and further wherein prints made with the conductive ink exhibit no coffee ring effect and a substantial absence of large nanoparticle aggregates.

BRIEF DESCRIPTION OF THE DRAWINGS

For a better understanding of the present embodiments, reference may be had to the accompanying figures.

DETAILED DESCRIPTION

Figure 1:
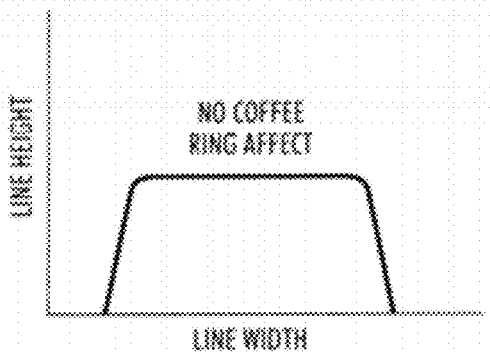
FIG. 1 illustrates a representative parameter of the coffee ring effect; the parameter is determined by comparing the measured height of the edge to the measured height of the center ($h_{edge}/h_{center}$). A ratio of 1.0 results in the height of the edge equal to the height of the center, and there is no coffee ring effect.

In the following description, it is understood that other embodiments may be utilized and structural and operational changes may be made without departure from the scope of the present embodiments disclosed herein.

Solvent ink technology broadens printing capability and customer base across many markets, and the diversity of printing applications will be facilitated by effective integration of printhead technology, print process and ink materials. As discussed above, while current ink options are successful for printing on various substrates, there is a need for more robust solvent inks comprising silver nanoparticles.

Described herein is an ink composition comprising metal nanoparticles comprising silver that may be used for printing. The ink is comprised of at least metal nanoparticles comprising silver. an optional resin and a mixture of ink vehicles (which may be referred to as solvents, in some cases). After printing and sintering, the silver nanoparticles in the ink composition may coalesce to form a conductive feature. The composition may be printed onto a substrate, then annealed to form conductive features on a substrate. The ink described herein exhibits enhanced properties such as reduced coffee ring effect, reduced surface roughness, improved adhesion, extended drying time and better dispersibility for the metal nanoparticles.

Pigment-based inks must be ejected from a printhead, reliably for numerous individual firing events during the lifetime of a printer. As an example, a typical inkjet nozzle may be required to fire in excess of $5 \times 10^7$, and up to as many as $1 \times 10^9$, individual firing events without malfunctioning or ceasing to fire altogether. This includes situations where the printhead is left idle or uncapped for long periods of time and then is actuated again to eject ink. In some instances the idle printhead nozzles can partially clog or crust with ink components thereby degrading the ability of the printhead to eject properly. For example, the ink can be misdirected from the partially clogged nozzles or the drop velocity can be greatly diminished. In some instances, the nozzle will become permanently clogged and in other instances a lengthy and costly maintenance operation may be required to recover the nozzle back to a usable state of operation. This phenomena is known in the art of inkjet printing as latency or de-cap. The present ink described herein reduces the risk of latency or de-cap by exhibiting extended drying time in the printhead nozzles.

The ink of the present embodiments comprises a specific mixture of ink vehicles or solvents which achieves the enhanced properties. For example, the mixed solvents with different evaporation rate minimizes the coffee ring effect while the high boiling point or low vapor pressure of particular solvent(s) extends the drying time of the ink. In embodiments, the drying time in the printer heads of the ink of the present embodiments is at least 5 hours, for example from about 5 hours to about 2 weeks including from about 5 hours about 1 week or from about 5 hours to about 24 hours. The solvent mixture also shows better dispersibility for silver nanoparticles, even for those batches with very high silver content of up to 90 wt %, thus reducing batch to batch variation. Lastly, a small amount of resin, for example, less than 5 percent by weight of the total weight of silver, or from about 0.05 to about 5 percent by weight of the total weight of the silver, including from about 0.1 to about 3 percent by weight or from about 0.5 to about 2 percent by weight of the total weight of the silver, incorporated into the ink effectively enhances adhesion.

The term "nano" as used in "metal nanoparticles" refers to, for example, a particle size of less than about 1,000 nm, such as, for example, from about 0.5 nm to about 1,000 nm, from about 1 nm to about 500 nm, from about 1 nm to about 100 nm, from about 1 nm to about 25 nm or from about 1 to about 10 nm. The particle size refers to the average diameter of the metal particles, as determined by TEM (transmission electron microscopy) or other suitable method. Generally, a plurality of particle sizes may exist in the metal nanoparticles obtained from the process described herein. In embodiments, the existence of different sized silver-containing nanoparticles is acceptable.

In embodiments, the ink composition comprises metal nanoparticles, an optional resin, and two or more ink vehicles. The metal nanoparticles further comprise silver. In further embodiments, the metal nanoparticles are stabilized metal nanoparticles comprising a metal nanoparticle core and an organic stabilizer shell layer. In a specific embodiment, the silver nanoparticles are organo-amine stabilized silver nanoparticles. In embodiments, the metal nanoparticles have a metal contents of at least 65 wt %, 85 wt % or of at least 90 wt %.

The nanoparticles may be present in an amount of from about 10 to about 85 percent by weight of the total weight of the ink composition, or from about 20 to about 60 percent by weight of the total weight of the ink composition.

In embodiments, at least one of the ink vehicles has a vapor pressure of less than 4 mm Hg at 25° C., or less than 2 mm Hg at 25° C., or less than 1 mm Hg at 25° C. In some embodiments, at least one of the ink vehicles is an aliphatic hydrocarbon, and in more specific embodiments, the aliphatic hydrocarbon is a cyclic hydrocarbon. The two or more vehicles may be selected from the group consisting of aliphatic hydrocarbon comprising at least one cyclohexane ring such as bicyclohexane, decahydronaphthalene, tetraline, and hexaline, cyclic terpene including monocyclic monoterpeene such as limonene and selinene, together with bicyclic monoterpene, cyclic terpinene such as Cyclodecene, 1-Phenyl-1-cyclohexene, 1-tert-Butyl-1-cyclohexene, Terpinolene, γ-Terpinene, α-Terpinene, α-Pinene, terpineol, methy nanphthalene, and mixtures thereof. In a particular embodiment, the two or more vehicles comprise decahydronaphthalene and bicyclohexane. In embodiments, the two or more solvents are present in an amount of from about 15 to about 90 percent by weight of the total weight of the ink composition including from about 20 to about 80 percent by weight or from about 30 to about 70 percent by weight of the ink composition.

In embodiments, the silver nanoparticles may be further composed of (i) one or more metals or (ii) one or more metal composites. Suitable metals in addition to silver may include, for example, Al, Au, Pt, Pd, Cu, Co, Cr, In, and Ni, particularly the transition metals, for example, Au, Pt, Pd, Cu, Cr, Ni, and mixtures thereof. Suitable metal composites may include Au—Ag, Ag—Cu, Ag—Ni, Au—Cu, Au—Ni, Au—Ag—Cu, and Au—Ag—Pd. The metal composites may also include non-metals, such as, for example, Si, C, and Ge. The various components of the metal composite may be present in an amount ranging, for example, from about 0.01 percent to about 99.9 percent by weight, particularly from about 10 percent to about 90 percent by weight. Furthermore, the composition described herein may not include any metal oxide nanoparticles.

In embodiments, the metal composite is a metal alloy composed of silver and one, two or more other metals, with silver comprising, for example, at least about 20 percent of the nanoparticles by weight, particularly greater than about 50 percent of the nanoparticles by weight.

The weight percentage of the nanoparticles in the ink may be from, for example, about 5 weight percent to about 80 weight percent, from about 10 weight percent to about 60 weight percent or from about 15 weight percent to about 50 weight percent.

In the present embodiments, the ink comprises two or more solvents. The selection of the solvents is based on various properties, for example, evaporation rates, boiling points and interaction with other ink components like the nanoparticles. In embodiments, the mixture of solvents comprises two or more solvents having different evaporation rates. In further embodiments, the mixture of solvents comprises one or more solvents having a boiling point of at least 150° C., or from about 150 to about 380° C., or from about 180 to about 280° C.

A solvent can also be characterized by its Hansen solubility parameters, which are the dispersion parameter, the solubility parameter, and the hydrogen bonding parameter. The solvent herein should have a dispersion parameter of about 16 $MPa^{0.5}$ or more, and the sum of a polarity parameter and a hydrogen bonding parameter is about 8.0 $MPa^{0.5}$ or less. More in particular, a selected solvent has a dispersion parameter value of about 16 $MPa^{0.5}$ more, for example from about 16 $MPa^{0.5}$ to about 25 $MPa^{0.5}$, or about 18 $MPa^{0.5}$ or more, for example from about 18 $MPa^{0.5}$ to about 25 $MPa^{0.5}$; and a sum of the polarity parameter and the hydrogen bonding parameter is about 8.0 $MPa^{0.5}$ or less, including 5.5 $MPa^{0.5}$ or less. Desirably, the polarity parameter is from about 1.5 $MPa^{0.5}$ to about 0 $MPa^{0.5}$, including from about 1.0 $MPa^{0.5}$ to about 0 $MPa^{0.5}$, and the hydrogen bonding parameter is from about 1.5 $MPa^{0.5}$ to about 0 $MPa^{0.5}$, including from about 1.0 $MPa^{0.5}$ to about 0 $MPa^{0.5}$.

The selection of the solvent can thus be based on the parameter values. A solvent, which is within the described Hansen solubility parameters, may be mixed with another solvent, so as the at least one solvent is within the indicated Hansen solubility parameter ranges.

Each of the Hansen solubility parameters for a given solvent can be found in known references, such as, Hansen Solubility Parameters: A User's Handbook, by Charles Hansen, 2007, 2nd Edition. Also, known modeling software, for example Fedors Cohesive Energy Density using a software such as SP2 method, can be used to calculate the Hansen solubility parameters based on the chemical structure of the solvent. The calculation is performed with the temperature of the solvent at 25° C.

In the Hansen solubility parameters, hydrogen bonding is an attractive interaction of a hydrogen atom with an electronegative atom. Therefore, a solvent will tend not to detach an organoamine stabilizer from the surface of the nanoparticle when the solvent has a hydrogen bonding parameter of about 1.5 $MPa^{0.5}$ or lower.

Polarity is an attraction caused by differences in electrical charges. Therefore, a solvent will tend not to detach an organoamine stabilizer from the surface of the nanoparticle when the solvent has a Hansen solubility polarity parameter of about 1.5 $MPa^{0.5}$ or lower.

Dispersion is an attractive force between atoms, molecules and surfaces. To ensure good stability of the metal nanoparticle stabilized by an organoamine, the solvent should have a dispersion parameter of at least 16 $MPa^{0.5}$.

The ink may have a surface tension from about 25 to about 35 mN/m, including from about 28 to about 32 mN/m. The composition may also have a viscosity from about 3 cps to about 20 cps, including from about 5 cps to about 15 cps.

Use of the indicated solvents can improve the ink as compared to other inks comprising nanoparticles that do not utilize two or more of these solvents. The ink exhibits substantially reduced coffee ring effect, enhanced adhesion to substrate and extended drying time in the print head, for example, from about 5 hours to about 1 week. The mixed solvents also provide better dispensability of the silver nanoparticles. Prints made with the conductive ink exhibit desirable qualities, such as no coffee ring effect and a substantial absence of large nanoparticle aggregates. In embodiments, the prints have a surface roughness of less than 20 nm.

The ink may further include a resin to improve adhesion to substrates. For example, the ink may comprise a resin selected from the group consisting of terpene, styrene block copolymers such as styrene-butadiene-styrene copolymer, styrene-isoprene-styrene copolymer, styrene-ehtylene/butylenes-styrene copolymer, and styrene-ethylene/propylene copolymer, ethylene-vinyl acetate copolymers, ethylene-vinyl acetate-maleic anhydride terpolymers, ethylene butyl acrylate copolymer, ethylene-acrylic acid copolymer, polyolefins, polybutene, polyamides, and the like and mixtures thereof. In embodiments, the resin is present in an amount of from about 0.05 to about 5 percent by weight of the total weight of the ink composition. In specific embodiments, the resin is present in an amount of from about 0.1 to about 3 percent by weight of the total weight of the ink composition.

Generally, silver nanoparticles have a stability (that is, the time period where there is minimal precipitation or aggregation of the silver-containing nanoparticles in the composition) of, for example, at least from about 5 days to about 1 month, from about 1 week to about 6 months, from about 1 week to over 1 year. The stability can be monitored using a variety of methods, for example, a dynamic light scattering method that probes the particle size, a simple filtration method using a determined filter pore size, for example 1 micron, to evaluate the solid on the filter.

In embodiments, the ink described herein may contain a stabilizer that is associated with the surface of the silver nanoparticles and is not removed until the annealing of the nanoparticles during formation of metal features on a substrate. The stabilizer may be organic.

In embodiments, the stabilizer is physically or chemically associated with the surface of the metal nanoparticles. In this way, the nanoparticles have the stabilizer thereon outside of a liquid solution. That is, the nanoparticles with the stabilizer thereon may be isolated and recovered from a reaction mixture solution used in forming the nanoparticles and stabilizer complex. The stabilized nanoparticles may thus be subsequently readily and homogeneously dispersed in a solvent for forming a printable solution.

As used herein, the phrase "physically or chemically associated" between the silver nanoparticles and the stabilizer may be a chemical bond and/or other physical attachment. The chemical bond may take the form of, for example, covalent bonding, hydrogen bonding, coordination complex bonding, or ionic bonding, or a mixture of different chemical bonds. The physical attachment may take the form of, for example, van der Waals' forces or dipole-dipole interaction, or a mixture of different physical attachments.

The term "organic" in "organic stabilizer" refers to, for example, the presence of carbon atom(s), but the organic stabilizer may include one or more non-metal heteroatoms such as nitrogen, oxygen, sulfur, silicon, halogen, and the like. The organic stabilizer may be an organoamine stabilizer such as those described in U.S. Pat. No. 7,270,694, which is incorporated by reference herein in its entirety. Examples of the organoamine are an alkylamine, such as for example butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof.

The metal nanoparticle is stabilized with a stabilizer which is comprised of a formula (I): X—Y. The X is a hydrocarbon group comprising at least 4 carbon atoms, including at least 8 carbon atoms, or at least 12 carbon atoms. The Y is a functional group attached to the surface of the metal nanoparticle. Examples of the functional groups Y include, for example, hydroxyl, amine, carboxylic acid, thiol and its derivatives, —OC(=S)SH (xanthic acid), pyridine, pyrrolidone, and the like. The organic stabilizer may be selected from the group consisting of polyethylene glycols, polyvinylpyridine, polyvinylpyrrolidone, and other organic surfactants. The organic stabilizer may be selected from the group consisting of a thiol such as, for example, butanethiol, pentanethiol, hexanethiol, heptanethiol, octanethiol, decanethiol, and dodecanethiol; a dithiol such as, for example, 1,2-ethanedithiol, 1,3-propanedithiol, and 1,4-butanedithiol; or a mixture of a thiol and a dithiol. The organic stabilizer may be selected from the group consisting of a xanthic acid such as, for example, o-methylxanthate, o-ethylxanthate, o-propylxanthic acid, o-butylxanthic acid, o-pentylxanthic acid, o-hexylxanthic acid, o-heptylxanthic acid, o-octylxanthic acid, o-nonylxanthic acid, o-decylxanthic acid, o-undecylxanthic acid, o-dodecylxanthic acid. Organic stabilizers containing a pyridine derivative (for example, dodecyl pyridine) and/or organophosphine that can stabilize metal nanoparticles may also be used as the stabilizer herein.

Further examples of organic stabilized metal nanoparticles may include: the carboxylic acid-organoamine complex stabilized metal nanoparticles, described in U.S. Patent Application Pub. No. 2009/0148600; the carboxylic acid stabilizer metal nanoparticles described in U.S. Patent App. Pub. No. 2007/0099357 A1, and the thermally removable stabilizer and the UV decomposable stabilizers described in U.S. Patent Application Pub. No. 2009/0181183, each of which is incorporated by reference herein in their entirety.

The extent of the coverage of stabilizer on the surface of the metal nanoparticles may vary, for example, from partial to full coverage depending on the capability of the stabilizer to stabilize the metal nanoparticles. Of course, there is variability as well in the extent of coverage of the stabilizer among the individual metal nanoparticles.

The weight percentage of the organic stabilizer in the metal nanoparticle (including only the metal particle and the stabilizer, exclude the solvent) may be from, for example, about 3 weight percent to about 60 weight percent, from about 5 weight percent to about 35 weight percent, from about 5 weight percent to about 20 weight percent, or from about 5 weight percent to about 10 weight percent. As a results, the weight percentage of the metal in the metal nanoparticle may be from for example about 40 weight percent to about 97 weight percent, from about 65 weight percent to about 95 weight percent, from about 80 to about 95, or from about 90 to about 95 weight percent.

Figure 2:
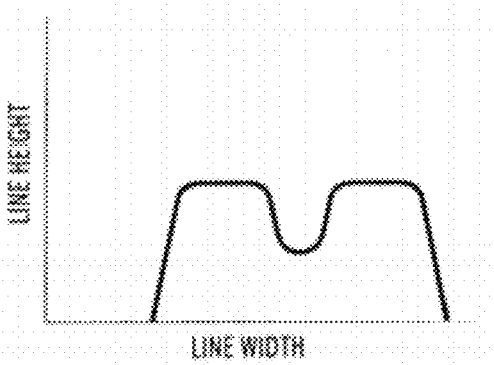
FIG. 2 is a graph showing the $h_{edge}$ and $h_{center}$ when the coffee ring effect ratio is greater than 1.0, and therefore the center is thinner compared to the edge.
Figure 3:
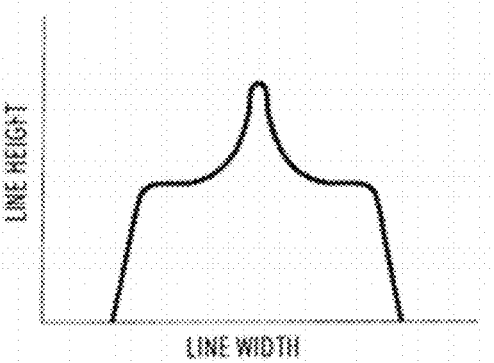
FIG. 3 is a graph showing the $h_{edge}$ and $h_{center}$ when the coffee ring effect ratio is less than 1, and therefore the center is thicker compared to the edge.

To quantify the coffee ring effect of a composition, a parameter $h_{edge}/h_{center}$ (also referred to as $h_e/h_c$ and defined here as the ratio of the edge height to the center height) is used. The disclosed metal nanoparticle composition and the comparable composition were both printed onto a substrate using a DMP-2800 inkjet printed equipped with 10 pL cartridges. The line profile was characterized after printing using a surface profilometer. The height of the edge ($h_{edge}$) and the height of the center ($h_{center}$) can be obtained. The ratio of $h_{edge}/h_{center}$ will illustrate if there is a coffee ring effect. (See FIG. 1). As seen in FIG. 1, when $h_{edge}/h_{center}$ is 1.0, there is no coffee ring effect and the surface of the printed line would be perfectly flat. As seen in FIG. 2, when $h_{edge}/h_{center}$ is greater than 1.0, the height of the center is less than the height of the edge, indicating a coffee ring effect, which becomes more apparent as the ratio increases from 1.0. Finally, as seen in FIG. 3, when $h_{edge}/h_{center}$ is lower than 1.0, the height of the center is higher than the height of the edge. This may be acceptable for most applications as well. In embodiments, the features printed with the metal nanoparticle composition of this disclosure have a $h_{edge}/h_{center}$ of around 1.0, for example from about 0.8 to about 1.2. In other embodiments, the $h_{edge}/h_{center}$ is less than 1.5 to about 1.0.

Figure 4A:
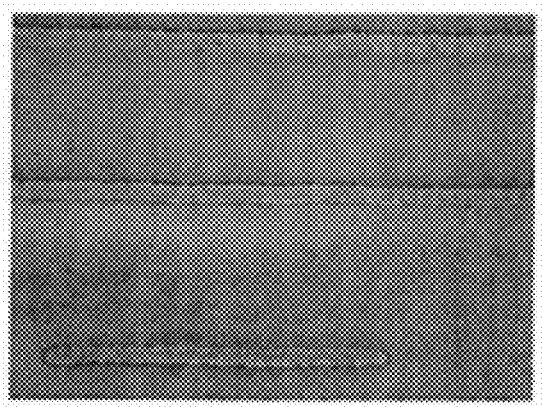
FIG. 4A is a photograph showing printed lines suffering from many black dots.
Figure 4B:
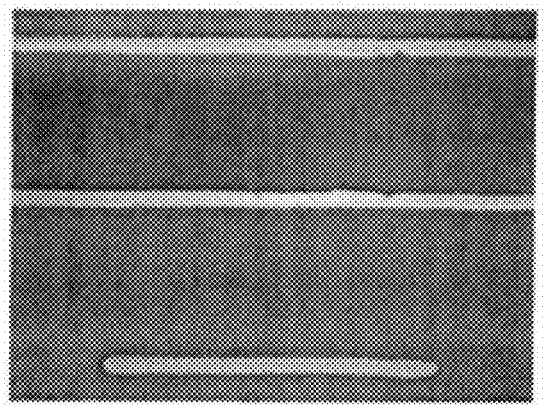
FIG. 4B is a photograph showing printed lines with a few black dots.
Figure 4C:
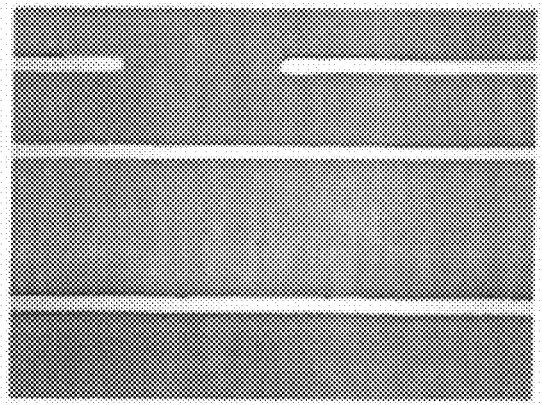
FIG. 4C is a photograph showing printed lines with no or few black dots (i.e., a substantial absence of large nanoparticle aggregates).

To quantify the black dots which may be the aggregates of the silver nanoparticles, a measurement of the surface roughness of a feature that was formed by the composition on the substrate after the printing was taken. It should be noted that the roughness of the substrate is minimal. The same printing method as above was preformed. The measurement was made by measuring the roughness of the surfaces of the printed features of the compositions, for example Ra. It should be noted that the waviness and/or coffee ring effect (if any) of the printed feature should be excluded during the measurement. The surface roughness can be measured by many methods, for example, by using a surface profilometer. The more numerous and larger the black dots, the more rough the surface is. The composition with a solvent that fits the Hansen solubility parameters had a surface roughness (Ra) of less than 15 nm, and was about 1 nm to 10 nm. Therefore, the composition had a very smooth appearance after printing. The comparable composition was found to have a surface roughness (Ra) of 15 nm or more, and could be up to 30 nm to 60 nm. If the surface roughness is high, the printed line will have multiple black dots present, thus the more black dots present, the more rough the printed composition is. Examples of printings with black dots present and not present can be seen in FIG. 4A-4C.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

High throughput silver nanoparticles with around 90 wt % silver content were used in the Examples. The Examples were evaluated on the premise that if the ink formulation could maintain variation of silver nanoparticles with 90 wt % silver content, the formulation should be robust for different batches. Preparation of the silver nanoparticles was conducted as disclosed previously in U.S. Pat. No. 7,494,608, hereby incorporated by reference, wherein the molar ratio of hexadecylamine to silver acetate was 5:1.

Three different inks were prepared with the silver nanoparticles in different solvent or solvent mixtures. The inks were prepared with 50 wt % loading of the silver nanoparticles in the solvent or solvent mixtures, and shaking the silver nanoparticles in the solvent or solvent mixture overnight (approximately hours). The three solvents used for the three inks were decahydronaphthalene, bicyclohexane and a mixture of decahydronaphthalene/bicycolohexane (at weight ratio of 1:1) (from Sigma-Aldrich (St. Louis, Mo.)). After filtration, the inks were tested with an inkjet printer (DMP-2800, equipped with 1.0 pL cartridge) to evaluate the jettability, drying time in nozzle, and printed line performance such as coffee ring effect and the line appearance.

Table 1 summarizes the results. All printed lines were highly conductive after annealing at 140° C. for 10 min. However, the line printed from the ink with decahydronaphthalene solvent only showed a coffee ring effect, and many black dots. Moreover, the ink dried quickly in the printer nozzles. After the ink was left on bench for 1 hour at room temperature, the nozzles were blocked. For the ink with bicyclohexane solvent only, the solvent extended the drying time significantly. However, the ink showed poor jettability. A long tail with poor directionality was often observed. The ink with optimal performance was that made from the mixture of both decahydronaphthalene and bicyclohexane. This ink showed good jettability, reasonable good drying time in nozzle, no coffee ring effect, and very good line appearance without black dots.

TABLE 1

| Solvents | Ink Drying Time (hr) | Jettability | Coffee Ring Observed | Line Appearance |
|---|---|---|---|---|
| decahydronaphthalene | ~1 | Good | Yes | Many black dots (See FIG. 4A) |
| bicyclohexane | ~20 | Poor, long tail, not straight drops | No | A few black dots (See FIG. 4B) |
| decahydronaphthalene/ bicycolohexane (1:1) mixture | ~5 | Good | No | No or few black dots (See FIG. 4C) |

Example 2

To further improve adhesion of the printed silver lines, a terpene resin (from Arizona Chemicals (Jacksonville, Fla.) was added to the ink formulation at 1.2 wt %. The formulation of this ink is shown in Table 2.

TABLE 2

| Ink Component | Weight (g) | Weight Percent (%) |
|---|---|---|
| Bicyclohexane | 0.4391 | 26.3 |
| Decahydronaphthalene | 0.5087 | 30.4 |
| Terpene | 0.0203 | 1.2 |
| Silver Nanoparticles | 0.7012 | 42.0 |
| Total | 1.6693 | 100.0 |

After printing and annealing at 140° C. for 10 min, the printed lines were subjected to an adhesion test by sticking Scotch Magic Tape (3M) to the surface of the conductive lines on the glass and then followed by peeling the Scotch Magic Tape (3M) off the surface. No or little silver was peeled off the substrate. In comparison, when no resin was used in the ink formulation, the adhesion was very poor and large amounts of lines could be peeled off.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An ink composition comprising:
   metal nanoparticles comprising silver;
   resin; and
   two or more ink vehicles, wherein at least one of the ink vehicles is an aliphatic hydrocarbon having a vapor pressure of less than 4 mm Hg at 25° C. and wherein the resin is present in an amount of from about 0.05 to about 5 percent by weight of the total weight of the ink composition.

2. The ink composition of claim 1, wherein the metal nanoparticles are stabilized metal nanoparticles comprising a metal nanoparticle core and an organic stabilizer shell layer.

3. The ink composition of claim 2, wherein the metal nanoparticles have a metal contents of at least 65 wt %.

4. The ink composition of claim 1 having an extended drying time in the printhead nozzles of at least 5 hours.

5. The ink composition of claim 2, wherein the stabilizer has a formula of X—Y, wherein X is a hydrocarbon group comprising at least 4 carbon atoms and Y is a functional group attached to a surface of the metal nanoparticle and being selected from the group consisting of hydroxyl, amine, carboxylic acid, thiol, xanthic acid, pyridine, pyrrolidone, and mixtures thereof.

6. The ink composition of claim 1, wherein the at least one ink vehicle being an aliphatic hydrocarbon has a vapor pressure of less than 1 mm Hg at 25° C.

7. The ink composition of claim 1, wherein the metal nanoparticles further comprises a metal or metal composite selected from the group consisting of gold, platinum, palladium, copper, cobalt, chromium, nickel, silver-copper composite, silver-gold-copper composite, silver-gold-palladium composite and combinations thereof.

8. The ink composition of claim 1, wherein the nanoparticles are present in an amount of from about 10 to about 85 percent by weight of the total weight of the ink composition.

9. The ink composition of claim 1, wherein the aliphatic hydrocarbon is a cyclic hydrocarbon.

10. The ink composition of claim 1, wherein the resin is selected from the group consisting of terpene, styrene block copolymers, ethylene-vinyl acetate copolymers, ethylene-vinyl acetate-maleic anhydride terpolymers, ethylene butyl acrylate copolymer, ethylene-acrylic acid copolymer, polyolefins, polybutene, polyamides, polyvinyl butyral, and mixtures thereof.

11. The ink composition of claim 1, wherein the two or more vehicles are selected from the group consisting of aliphatic hydrocarbon comprising at least one cyclohexane ring, cyclic terpene, cyclic terpinene, terpineol, methyl naphthalene, and mixtures thereof.

12. The ink composition of claim 1, wherein the two or more solvents are present in an amount of from about 15 to about 90 percent by weight of the total weight of the ink composition.

13. An ink composition comprising:
   silver nanoparticles, and
   two or more ink vehicles being selected from the group consisting of aliphatic hydrocarbon comprising at least one cyclohexane ring, cyclic terpene, cyclic terpinene, terpineol, methy nanphthalene, and mixtures thereof, wherein the ink composition has an extended printhead de cap time of from about 5 hours to about 1 week.

14. The ink composition of claim 13, wherein the composition further comprises a resin selected from the group consisting of terpene, styrene block, ethylene-vinyl acetate copolymers, ethylene-vinyl acetate-maleic anhydride terpolymers, ethylene butyl acrylate copolymer, ethylene-acrylic acid copolymer, polyolefins, polybutene, polyamides, polyvinyl butyral and mixtures thereof.

15. The ink composition of claim 13, wherein the silver nanoparticles are organo-amine stabilized silver nanoparticles.

16. The ink composition of claim 13, wherein at least one of the ink vehicles is selected from the group consisting of bicyclohexane, tetralin, hexalin, limonene, selinene, cyclodecene, 1-phenyl-1-cyclohexene, 1-tert-butyl-1-cyclohexene, terpinolene, $\gamma$-terpinene, $\alpha$-terpinene, $\alpha$-pinene, and mixtures thereof.

* * * * *